Patented Apr. 7, 1931

1,799,989

UNITED STATES PATENT OFFICE

FRIEDRICH RÜSBERG, OF MANNHEIM, AND GUSTAV CLAUSS, OF MANNHEIM-WOHL-GELEGEN, GERMANY, ASSIGNORS TO FIRM RHENANIA-KUNHEIM VEREIN CHEMISCHER FABRIKEN A. G.

MANUFACTURE OF BARIUM HYDROXIDE

No Drawing. Application filed May 24, 1928, Serial No. 280,377, and in Germany June 22, 1927.

This invention relates to the production of barium hydroxide from barium silicates. It is well known that barium hydroxide may be obtained from barium ortho- or trisilicates by hydrolyzing the latter with water, part of the barium remaining combined with silica in the form of barium meta-silicate.

In carrying out this process on an industrial scale we have found that barium silicates often behave very differently and furnish quite different yields of baryta, although their chemical composition may be identical. Apparently this phenomenon is attributable either to slight contaminations contained in the raw materials which were used for making the barium silicates, or to a different physical structure of the materials in question. Whether or not satisfactory yields are to be expected from barium silicate hydrolysis, may easily be ascertained by adding water to the comminuted material reduced to grains measuring about 0.1–0.5 mm. in diameter. With easily hydrolyzed materials the temperature immediately increases greatly whereas in the other case no increase of temperature is observed. In the first case the barium silicate is practically completely hydrolyzed, by boiling with water, to barium meta-silicate and baryta, and strong crystallizable solutions of baryta are obtained, whereas the solutions obtained in the latter case are hardly saturated at common temperature, so that for completing the hydrolysis considerable quantities of water must be employed, the subsequent evaporation of which impairs the economy of the process.

Now we have found that even in the latter case the hydrolysis may be carried out so that small quantities of water are needed and strong crystallizable solutions are obtained. This success is achieved by employing the barium silicate in the state of extremely fine distribution. The degree of distribution will depend upon the nature of the barium silicate employed, since the latter will be more or less easily hydrolyzed according to the method of its production or to the nature of the contaminations contained therein. Most satisfactory results are obtained by distributing the material in a liquid medium, preferably water, and then disintegrating it to a practically colloidal fineness by grinding the material either in a ball mill or in another suitable grinder. In this case the milling and the hydrolyzing process may be preferably combined by carrying out the grinding operation at an elevated temperature.

Examples (1) 1 kilogram of a barium silicate obtained by heating barium sulfate with silica in a current of steam (see German Patent No. 443,320) containing 92% of $Ba_2SiO_4$ was subjected to wet-grinding with 2 liters of water in a ball mill for 8 hours. The resulting suspension was heated to its boiling point and boiled for two hours, the steam escaping from the solution being continuously condensed in a cooler, and the condensate being returned to the vessel. Then the solution was filtered off from the residue left. The resulting caustic baryta solution contained 32% of $Ba(OH)_2.8H_2O$ and, on cooling down, separated abundant quantities of crystallized barium hydroxide.

By employing a barium silicate comminuted by dry grinding, the size of the grains being about 0.2 mm., only solutions containing from 5 to 6% of $Ba(OH)_2.8H_2O$ were obtained when the same proportions of ingredients and an extended duration of boiling were used.

(2) 1 kilogram of a barium silicate obtained from barium carbonate and barium meta-silicate (the latter being repeatedly used) and showing the following composition:

$Ba_2SiO_4$ _____ 79.90 %
$Ba_3SiO_5$ _____ 15.5 % was subjected to wet-grinding with 2 liters of water in a ball mill as in the foregoing example. Thereupon the mass was refluxed for 2 hours. The baryta solution filtered off contained 34% of $Ba(OH)_2.8H_2O$.

Instead of water a baryta mother liquor saturated at common temperature may be employed. In this case a stronger baryta solution and a correspondingly increased yield of crystallized barium hydroxide are obtained.

We claim:—

1. Process of producing barium hydroxide which comprises finely grinding barium silicate in presence of water and thereby hydrolyzing the finely ground product.

2. Process of producing barium hydroxide which comprises finely grinding barium silicate in presence of water at an elevated temperature.

In testimony whereof we affix our signatures.

FRIEDRICH RÜSBERG.
GUSTAV CLAUSS.